(12) United States Patent
Carlson et al.

(10) Patent No.: US 10,058,949 B2
(45) Date of Patent: Aug. 28, 2018

(54) RESISTANCE SPOT WELDING STEEL AND ALUMINUM WORKPIECES USING INSERTABLE COVER

(71) Applicant: GM GLOBAL TECHNOLOGY OPERATIONS LLC, Detroit, MI (US)

(72) Inventors: Blair E. Carlson, Ann Arbor, MI (US); David Yang, Shanghai (CN); David R. Sigler, Shelby Township, MI (US); Robert T. Szymanski, St. Clair Township, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 552 days.

(21) Appl. No.: 14/503,504

(22) Filed: Oct. 1, 2014

(65) Prior Publication Data

US 2015/0096961 A1    Apr. 9, 2015

Related U.S. Application Data

(60) Provisional application No. 61/886,866, filed on Oct. 4, 2013.

(51) Int. Cl.
*B23K 9/28*    (2006.01)
*B23K 11/00*   (2006.01)
(Continued)

(52) U.S. Cl.
CPC .............. *B23K 11/20* (2013.01); *B23K 11/115* (2013.01); *B23K 2203/20* (2013.01)

(58) Field of Classification Search
CPC .......... B23K 11/10; B23K 11/20; B23K 9/28; B23K 11/00; B23K 11/115; B23K 2203/20
(Continued)

(56) References Cited

U.S. PATENT DOCUMENTS 4,343,982 A * 8/1982 Schwartz .............. B23K 11/20
219/118
4,352,003 A * 9/1982 Arnoldt ................ B23K 11/314
219/103
(Continued)

FOREIGN PATENT DOCUMENTS

CN    101623793 A    1/2012
CN    102343474 A    2/2012
(Continued)

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.
(Continued)

*Primary Examiner* — Michael G Hoang
(74) *Attorney, Agent, or Firm* — Reising Ethington P.C.

(57) ABSTRACT

A method of resistance spot welding a steel workpiece and an aluminum or aluminum alloy workpiece together includes several steps. One step involves inserting a cover between the aluminum or aluminum alloy workpiece and an adjacent welding electrode. In another step, the adjacent welding electrode is pressed against cover, and another opposed welding electrode is pressed against the steel workpiece at a weld site. In yet another step, electrical current is passed between the welding electrodes, passed through the cover, and passed through the workpieces in order to initiate and grow a molten weld pool within the aluminum or aluminum alloy workpiece.

19 Claims, 3 Drawing Sheets

(51) Int. Cl.
  *B23K 11/20* (2006.01)
  *B23K 11/11* (2006.01)
  *B23K 103/20* (2006.01)

(58) Field of Classification Search
  USPC .......................................... 219/91.2, 92, 94
  See application file for complete search history.

(56) References Cited

U.S. PATENT DOCUMENTS

| | | | |
|---|---|---|---|
| 7,850,059 | B2 | 12/2010 | Kobayashi et al. |
| 7,935,908 | B2 | 5/2011 | Nakagawa et al. |
| 7,984,840 | B2 | 7/2011 | Kobayashi et al. |
| 8,020,749 | B2 | 9/2011 | Kobayashi et al. |
| 8,058,584 | B2 | 11/2011 | Miyamoto et al. |
| 8,487,206 | B2 | 7/2013 | Urushihara et al. |
| 2003/0183602 | A1* | 10/2003 | Hughes ................. B23K 11/115 219/92 |
| 2005/0230362 | A1* | 10/2005 | Stieglbauer ............ B23K 11/11 219/119 |
| 2007/0158337 | A1* | 7/2007 | Stieglbauer ............ B23K 11/11 219/617 |
| 2011/0266260 | A1 | 11/2011 | Sigler et al. |
| 2013/0189023 | A1* | 7/2013 | Spinella ............. B23K 11/0026 403/270 |

FOREIGN PATENT DOCUMENTS

| | | |
|---|---|---|
| JP | H07328714 A | 12/1995 |
| JP | 11342477 | 12/1999 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Yang et al., U.S. Appl. No. 14/181,020 entitled "Electrode for Resistance Spot Welding of Dissimilar Metals," filed Feb. 14, 2014.

Yang et al., U.S. Appl. No. 14/181,955 entitled "Resistance Spot Welding Steel and Aluminum Workpieces with Protuberance," filed Feb. 17, 2014.

Sigler et al., U.S. Appl. No. 14/268,422 entitled "Resistance Spot Welding of Steel to Pre-Coated Aluminum," filed May 2, 2014.

Sigler et al., U.S. Appl. No. 14/462,655 entitled "Resistance Spot Welding Steel and Aluminum Workpieces Using Electrode Weld Face Cover," filed Aug. 19, 2014.

Sigler et al, U.S. Appl. No. 14/464,476 entitled "Multi-Step Direct Welding of an Aluminum-Based Workpiece to a Steel Workpiece," filed Aug. 20, 2014.

Schroth et al., U.S. Appl. No. 14/488,799 entitled "Resistance Spot Welding Steel and Aluminum Workpieces with Hot Welding Electrode at Aluminum Workpiece," filed Sep. 17, 2014.

Carlson et al, U.S. Appl. No. 14/503,504 entitled "Resistance Spot Welding Steel and Aluminum Workpieces Using Insertable Cover," filed Oct. 1, 2014.

Sigler et al., U.S. Appl. No. 14/503,969 entitled "Aluminum Alloy to Steel Welding Process," filed Oct. 1, 2014.

Wang et al, U.S. Appl. No. 14/561,746 entitled "Resistance Spot Welding Steel and Aluminum Workpieces with Electrode Insert," filed Dec. 5, 2014.

\* cited by examiner

RESISTANCE SPOT WELDING STEEL AND ALUMINUM WORKPIECES USING INSERTABLE COVER

CROSS-REFERENCE TO RELATED APPLICATIONS

This application claims the benefit of U.S. provisional patent application No. 61/886,866, filed on Oct. 4, 2013, the entire contents of which are hereby incorporated by reference.

TECHNICAL FIELD

The technical field of this disclosure relates generally to resistance spot welding and, more particularly, to resistance spot welding a steel workpiece and an aluminum or aluminum alloy workpiece together.

BACKGROUND

Resistance spot welding is used in a number of industries to join together two or more metal workpieces. The automotive industry, for example, often uses resistance spot welding to join together pre-fabricated metal workpieces during the manufacture of a vehicle door, hood, trunk lid, or lift gate, among other vehicle parts. Multiple individual resistance spot welds are typically formed along a peripheral region of the workpieces or at some other bonding region to ensure the vehicle part is structurally sound. While spot welding has typically been performed to join together certain similarly-composed metal workpieces—such as steel-to-steel and aluminum alloy-to-aluminum alloy—the desire to incorporate lighter weight materials into a vehicle platform has created interest in joining steel workpieces to aluminum or aluminum alloy (hereafter collectively "aluminum" for brevity) workpieces by resistance spot welding. Moreover, the ability to resistance spot weld workpiece stack-ups containing different workpiece combinations (e.g. aluminum alloy/aluminum alloy, steel/steel, and aluminum alloy/steel) with one piece of equipment would increase production flexibility and reduce manufacturing costs.

Resistance spot welding, in general, relies on the resistance to the flow of an electrical current through contacting metal workpieces and across their faying interface to generate heat. To carry out such a resistance welding process, a pair of opposed welding electrodes are typically clamped at aligned spots on opposite sides of the workpieces at a predetermined weld site. An electrical current is then passed through the workpieces from one welding electrode to the other. Resistance to the flow of this electrical current generates heat within the workpieces and at their faying interface. When the metal workpieces being welded are a steel workpiece and an aluminum workpiece, the heat generated at the faying interface initiates a molten weld pool in the aluminum workpiece. This molten aluminum weld pool wets the adjacent surface of the steel workpiece and, upon stoppage of the current flow, solidifies into an aluminum weld nugget that forms all or part of a weld joint between the two metal workpieces.

Resistance spot welding a steel workpiece to an aluminum workpiece presents certain challenges. For one, steel has a relatively high melting point and relatively high thermal and electrical resistivities, while aluminum has a relatively low melting point and relatively low thermal and electrical resistivities. As a result of these differences, aluminum melts more quickly and at a much lower temperature than steel during current flow. Aluminum also cools down more quickly than steel after current flow has ceased. Controlling heat balance between the two metals so that a molten weld pool can be rapidly initiated and solidified in the aluminum workpiece can therefore be challenging. It has been found, for example, that upon rapid cooling using standard industry practices, defects in the molten aluminum weld pool such as shrinkage voids, gas porosity, oxide residue, and microcracking are drawn toward and to gather at the faying interface. Additionally, prolonged heating during resistance spot welding—more specifically an elevated temperature in the steel workpiece due to its relatively higher resistance—is conducive to the growth of brittle Fe—Al intermetallic layers at the faying interface between the molten aluminum weld pool and the steel workpiece. These two conditions have been shown to reduce the peel strength and weaken the overall integrity of the ultimately-formed weld joint.

SUMMARY OF THE DISCLOSURE

A method of resistance spot welding a workpiece stack-up that includes a steel workpiece and an aluminum or aluminum alloy (again, collectively referred to in this disclosure as "aluminum" for brevity) workpiece is disclosed. The method involves inserting a cover between the aluminum workpiece and the adjacent welding electrode that faces the aluminum workpiece. The cover is then sandwiched between the aluminum workpiece and its corresponding welding electrode, and makes contact with both of them. The cover is preferably made of a metal having a greater electrical resistivity than that of the welding electrode that makes contact with the aluminum workpiece, and preferably has an electrical resistivity that is greater than that of the aluminum workpiece itself. Examples of metal materials that have a greater electrical resistivity than the aluminum workpiece include stainless steel, molybdenum or a molybdenum-based alloy, niobium or a niobium-based alloy, or tungsten or tungsten-based alloys such as a tungsten-copper alloy.

The cover, when inserted and in use, promotes at least one of two different effects on the aluminum side of the workpiece stack-up that would otherwise not be present if the welding electrode on that side of the stack-up was simply brought into direct contact with the aluminum workpiece. First, if the cover has a different geometry than the weld face of the adjacent aluminum side welding electrode—and especially if the cover makes contact with the aluminum workpiece over a greater surface area—the cover will reduce the current density in the aluminum workpiece as compared to the steel workpiece provided it does not deform under pressure to match the shape of the contacting electrode weld face. Indeed, when a radiused welding electrode is pressed against one side of the cover during electrical current flow—instead of being pressed directly against the aluminum workpiece—the electrical current being passed between opposed welding electrodes has a reduced density within the aluminum workpiece on account of the broader interfacial contact area established between the cover and the aluminum workpiece. And decreasing the current density in the aluminum workpiece relative to the steel workpiece has the effect of altering the temperature gradients surrounding the molten weld pool created in the aluminum workpiece, which encourages lateral heat dissemination from the molten aluminum weld pool into the workpiece stack-up.

Second, if the cover is composed of a metal having a greater electrical resistivity than the adjacent welding electrode, the cover will generate and provide heat to the aluminum workpiece as a result of electrical current flow through the cover that would otherwise not be present. And when constructed of a metal having a greater electrical resistivity than the aluminum workpiece, the cover will heat up to a relatively greater extent, thus introducing more heat into the aluminum alloy workpiece at the weld site. The ability of the cover to furnish additional heat to the aluminum workpiece in addition to, and from the opposite direction of, the heat developed in the steel workpiece during current flow has the effect of inhibiting rapid directional heat dissemination from the molten aluminum weld pool to the aluminum side welding electrode. This, in turn, as before, encourages lateral heat dissemination from the molten aluminum weld pool into the workpiece stack-up by altering the temperature gradients surrounding the molten weld pool created in the aluminum workpiece. In cases where the cover geometry matches the weld face geometry by design or the cover is sufficiently flexible that it will deform under pressure to match the geometry of the contacting electrode weld face, the primary effect of the cover is to provide heat to the aluminum workpiece without necessarily modifying current density.

The use of the cover to change the current density in the aluminum workpiece and/or to furnish additional heat to the aluminum workpiece, and to thus encourage lateral heat dissemination from the molten aluminum weld pool, is believed to alter the solidification behavior of the molten aluminum weld pool created in the aluminum workpiece in a way that precludes the unwanted accumulation of defects at and along a faying interface of the workpiece stack-up. Specifically, instead of driving or sweeping towards the faying interface, it is believed that the current density and/or heating effects attributed to the cover force weld defects towards the center of the ultimately-formed weld nugget where they are less likely to impact the strength of the weld joint. Additionally, if made of a more electrically resistive metal, the cover can also reduce the heat that is generated in the steel workpiece which, consequently, inhibits the growth of brittle Fe—Al intermetallic layer(s) at the faying interface. The overall strength and integrity of the weld joint established between the workpieces can therefore be improved by use of the disclosed cover and accompanying method.

Several ways of inserting the cover between the aluminum workpiece and welding electrode, and then retracting the cover therefrom, are disclosed. One way involves an arm that pivots between an inserted position and a removed position. Other ways can involve guide rails, grooves, guide tubes, spools, or a combination of these items, as well as other items. The cover itself can be provided in different forms, including in the form of a cover plate or a cover tape. Each of the cover plate and the cover tape can be constructed to facilitate a single spot welding event or multiple spot welding events. The cover plate, for example, may be used during a single spot welding event and then discarded or refurbished. Or it may be suitable for multi-use applications in which multiple weld joints can be consecutively formed using the same cover plate due to thickness and durability of the plate. In that scenario, the operational use of the cover plate could even be extended by intermittent cleaning of built-up contamination. Likewise, the cover tape may be suitable for single-use applications in which a single weld joint is formed and the used portion of the tape discarded, or it may be constructed with multi-use applications of the same tape portion in mind.

The ability of the cover to be inserted and extracted as needed lends flexibility to the spot welding process and related equipment in a manufacturing setting. For instance, because it can be inserted and refracted, the cover provides the capability to resistance spot weld aluminum-to-aluminum workpiece stack-ups, steel-to-steel workpiece stack-ups, and steel-to-aluminum workpiece stack-ups without necessarily changing equipment or making other modifications that would slow down production. The cover could be inserted and used when spot welding aluminum to steel, and then be refracted and not used when spot welding steel to steel or aluminum to aluminum, and so on based on manufacturing schedules. This capability expands production flexibility and reduces manufacturing costs.

DETAILED DESCRIPTION

The methods and assemblies detailed in this description resolve several challenges encountered when resistance spot welding a workpiece stack-up that includes an aluminum workpiece and a steel workpiece. Though described in more detail below, in general the methods and assemblies described can alter the solidification behavior of a created molten aluminum weld pool and thereby limit or altogether preclude the accumulation of defects at and along the faying interface of the aluminum and steel workpieces. The methods and assemblies can also minimize the size and thickness of Fe—Al intermetallic layer(s) formed at the faying interface. Of course, other improvements are possible. Taken together or alone, these measures help maintain suitable peel strength of the weld joint formed between the aluminum and steel workpieces, and help ensure the overall strength and integrity of the joint. And while the methods and welding electrodes are described below in the context of vehicle body parts, skilled artisans will know and understand that such methods and welding electrodes may be used in other contexts such as aerospace, marine, and industrial equipment applications.

Figure 1:
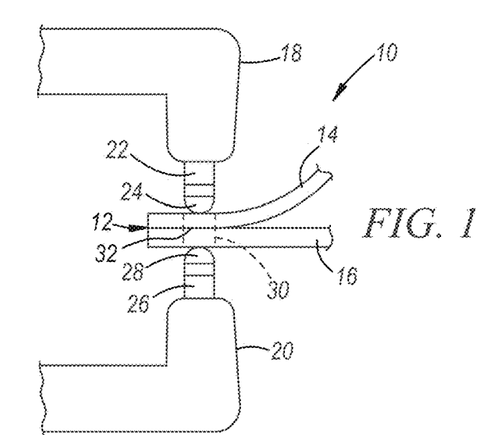
FIG. 1 is a side view of a resistance spot welding assembly.

FIG. 1 shows one example of a resistance spot welding assembly 10 that can be used to resistance spot weld a workpiece stack-up 12 that includes a steel workpiece 14 and an aluminum workpiece 16 that are overlaid on each other. Though not shown in FIG. 1, the workpiece stack-up 12 could include additional workpieces, such as a single aluminum workpiece and a pair of steel workpieces to constitute a stack-up totaling three workpieces, among other possibilities. Each of the steel and aluminum workpieces 14, 16 can have a thickness that ranges between 0.3 mm and 6.0 mm, between 0.5 mm and 4.0 mm, and more narrowly between 0.6 mm and 2.5 mm, although other thickness dimensions are possible. The term "workpiece" and its steel and aluminum variations is used broadly in this description to refer to a sheet metal layer, a casting, an extrusion, or any other piece that is resistance spot weldable.

The steel workpiece 14 can be a galvanized low carbon steel, a galvanized advanced high strength steel (AHSS), an aluminum coated steel, a low carbon steel, a bare steel, or another type of steel. Some specific kinds of steels that can be used in the steel workpiece 14 include, but are not limited to, interstitial-free (IF) steel, dual-phase (DP) steel, transformation-induced plasticity (TRIP) steel, and press-hardened steel (PHS). The aluminum workpiece 16, on the other hand, can be aluminum, an aluminum-magnesium alloy, an aluminum-silicon alloy, an aluminum-magnesium-silicon alloy, an aluminum-zinc alloy, or another type of aluminum. Some more specific kinds of aluminum alloys that can be used in the aluminum workpiece 16 include, but are not limited to, 5754 aluminum-magnesium alloy, 6022 aluminum-magnesium-silicon alloy, 7003 aluminum-zinc alloy, and Al-10Si—Mg aluminum die casting alloy. In addition, these and other suitable aluminum alloys (as well as aluminum) may be coated with zinc or conversion coatings typically used to improve adhesive bond performance. Optionally, weld-through adhesives or sealers that are normally used in resistance spot welding operations may be present.

Still referring to FIG. 1, the resistance spot welding assembly 10 is typically a part of a larger automated welding operation that includes a first welding gun arm 18 and a second welding gun arm 20 that are mechanically and electrically configured to repeatedly form resistance spot welds. The first welding gun arm 18 can have a first electrode holder 22 that secures a first welding electrode 24, and likewise the second welding gun arm 20 can have a second electrode holder 26 that secures a second welding electrode 28. The welding electrodes 24, 28 may be composed of a suitable copper alloy such as the copper-zirconium alloy that commonly goes by the designation C15000. When engaged in resistance spot welding, the welding gun arms 18, 20 press their respective welding electrodes 24, 28 against opposite sides and outer surfaces of the overlaid workpieces 14, 16 at a weld site 30, with accompanying weld faces of the electrodes aligned across and with each other. A faying interface 32 is located between the steel and aluminum workpieces 14, 16 at confronting and abutting inner surfaces of the workpieces 14, 16.

Figure 2:
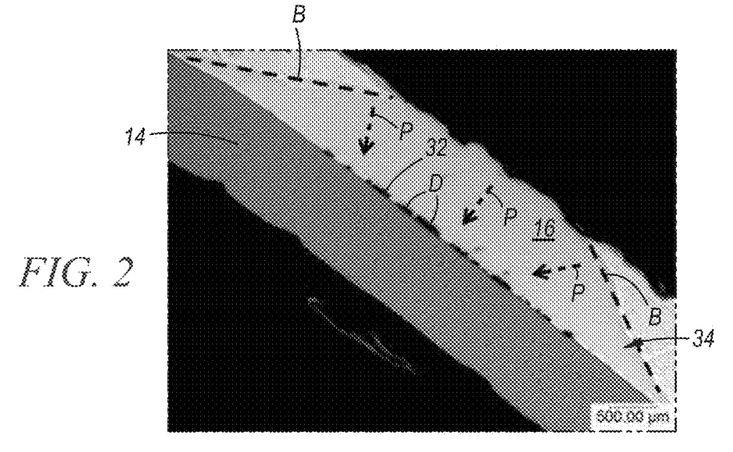
FIG. 2 is a microstructure of a weld nugget formed via a resistance spot welding process without using a cover like the ones detailed in the description below.

FIG. 2 illustrates a microstructure of an aluminum weld nugget 34 formed by a resistance spot welding process without the use of a cover like the ones detailed below. While a suitable weld nugget may be formed in some instances without using a cover, in this example defects D have been discovered at and along the faying interface 32. Among other possibilities, the defects D may include shrinkage voids, gas porosity, oxide residue, and micro-cracking. When present and dispersed along the faying interface 32, it has been found that the defects D may reduce the peel strength of the weld joint established between the steel and aluminum workpieces 14, 16 and may negatively impact and weaken the overall integrity of the joint. Moreover, in addition to the defects D, one or more Fe—Al intermetallic layers (not shown), which are also considered part of the weld joint, may grow between the steel and aluminum workpieces 14, 16 at the faying interface 32. The Fe—Al intermetallic layer(s) can consist of $FeAl_3$ and $Fe_2Al_5$, as well as other compounds, and when present are often hard and brittle. Again here, the Fe—Al intermetallic layer(s) can have a negative impact on the overall integrity of the joint if allowed to grow extensively.

Although not intending to be confined to particular theories of causation, it is currently believed that the accumulation of the defects D at and along the faying interface 32 is due to the solidification behavior of the molten aluminum weld pool as it transitions into the aluminum weld nugget 34. That is, a heat imbalance can develop between the much hotter steel workpiece 14 and the aluminum workpiece 16 because of the dissimilar physical properties of the two metals—namely, the much greater thermal and electrical resistivities of the steel. The steel therefore acts as a heat source, while the aluminum acts as a heat conductor, meaning the molten aluminum weld pool created within the aluminum workpiece 16 cools and solidifies from its outer perimeter toward the faying interface 32 as heat from the weld pool is extracted directionally through the water-cooled welding electrode in contact with the aluminum workpiece. The path and direction of the solidification front is represented in FIG. 2 generally by broken arrows P, and a boundary of the aluminum weld nugget 34 is represented generally by broken lines B. The path P is pointed at the faying interface 32 and the more slanted boundary B (compared to that shown in FIG. 10) is the result of solidification of the molten aluminum weld pool toward the faying interface 32. Directed this way, weld pool defects D are drawn or swept towards the faying interface 32 as the solidification front progresses along path P, and may end up dispersed along the faying interface 32. Furthermore, it is currently believed that the growth of the Fe—Al intermetallic layer(s) is due at least in part to the increased temperature experienced by the steel workpiece 14 during the resistance spot welding process.

Referring now to FIGS. 3-9, in order to limit and in some cases altogether preclude the accumulation and dispersion of the defects D along the faying interface 32, a cover 36 is inserted between the aluminum workpiece 16 and the adjacent welding electrode that faces the aluminum workpiece 16 (in this example, the second welding electrode 28). In general, and as described below in greater detail, the cover 36 can cause one or both of a reduction in current density through the aluminum workpiece 16 and the generation of heat on the side of the aluminum workpiece 16 opposite the steel workpiece 14 that ordinarily would not be produced due to the fact that the second welding electrode 28 is often aggressively cooled with water. In some instances, the cover 36 may be made of a metal having a greater electrical resistivity than that of the second welding electrode 28 and, preferably, greater than that of the aluminum workpiece 16, which causes the cover 36 itself to also generate heat. The change in current density and/or the additional heat input attributed to the cover 36—which is introduced into the aluminum workpiece 16 at the weld site 30 in addition to, and from the opposite direction of, the heat developed in the steel workpiece 14—affects the solidification behavior of the molten aluminum weld pool as it cools and solidifies into the aluminum weld nugget 34, which is believed to improve the peel strength of the weld joint established between the workpieces 14, 16. A cover 36 that generates heat can also minimize the size and thickness of the Fe—Al intermetallic layer(s) that may form at the faying interface 32.

As mentioned, the cover 36 may be made of a metal having a greater electrical resistivity than that of the second welding electrode 28 and preferably greater than that of the aluminum workpiece 16 so that the bulk cover 36 itself can generate heat in addition to what is generated in the steel workpiece 14. When the second welding electrode 28 is composed of a copper alloy, for example, as described below with the different embodiments, the cover 36 can be made of a steel material such as a stainless steel or a bare low carbon steel, or it can be made of a high melting point metal that exhibits limited reaction with aluminum, such as molybdenum or a molybdenum-based alloy, tungsten or a tungsten-based alloy such as a tungsten-copper alloy, or niobium or a niobium-based alloy, among other possibilities.

Figure 3:
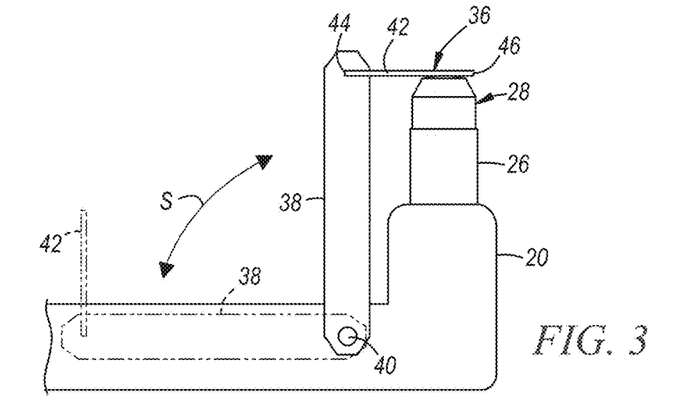
FIG. 3 is a side view of an embodiment of a cover that is to be inserted between an aluminum workpiece and an adjacent welding electrode and an embodiment of an associated welding gun arm.
Figures 4, 5, 6:
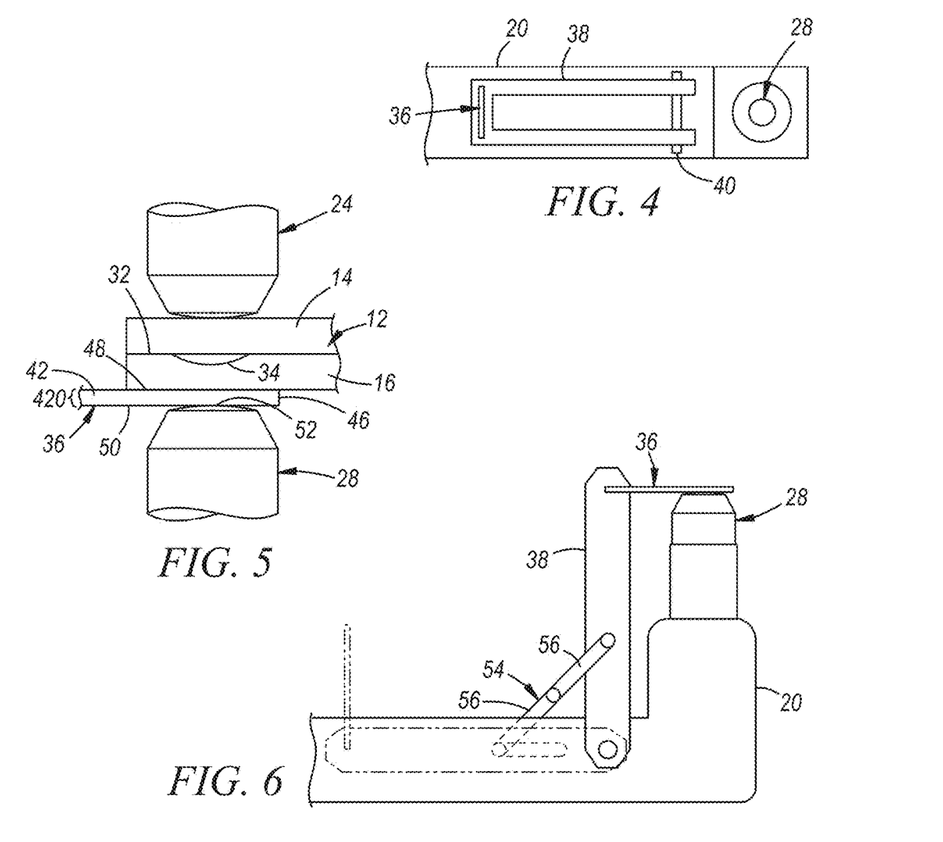
FIG. 4 is a top view of the cover and welding gun arm of FIG. 3.
FIG. 5 is an enlarged view of the cover of FIG. 3 and a workpiece stack-up and a pair of welding electrodes all brought together for practicing a resistance spot welding.
FIG. 6 is a side view of another embodiment of a cover that is to be inserted between an aluminum workpiece and an adjacent welding electrode and of an associated welding gun arm.

Whatever its composition, the cover 36 can be inserted between the aluminum workpiece 16 and the second welding electrode 28, and can also be removed and withdrawn, by way of several different mechanisms. In some cases, the exact insertion and removal mechanism may depend upon the design and construction of the welding gun arm or of the larger resistance spot welding assembly 10. In the embodiment of FIGS. 3-5, for example, the insertion and removal functionality is carried out by an arm 38 connected and mechanically coupled to the second welding gun arm 20. Here, the arm 38 is pivotally connected to the second welding gun arm 20 at a location spaced from the second electrode holder 26 and from the second welding electrode 28. The arm 38 rotates about a pivot axle and axis 40 along a swing path S between its inserted position and state (shown in solid lines in FIG. 3) in which the cover 36 can be placed between the aluminum workpiece 16 and second welding electrode 28, and its removed position and state (shown in broken lines in FIG. 3) in which the cover is retracted from between the aluminum workpiece 16 and second welding electrode 28.

The pivot axle 40 can be mounted and journalled directly to the second welding gun arm 20, as shown, or it can be mounted and journalled to a pair of brackets that themselves are attached to the second welding gun arm. Of course, other mountings are possible that provide rotation and swinging about the pivot axis, despite not being expressly shown and describe here. Furthermore, movement between the inserted and removed positions can be automated by a motor, such as a servo rotary actuator or a pneumatically powered actuator, or the movement can be manually controlled. In the case of automation, the movement can be regulated by a controller that is electrically coupled to the motor and programmed to insert the cover 36 between the aluminum workpiece 16 and the adjacent second welding electrode 28 at the weld site 30 when resistance spot welding the aluminum and steel workpieces 14, 16, and to remove the cover 36 once the current flow between the welding electrodes 24, 28 has ceased and the second welding electrode 28 has been retracted away from the cover 36.

In the embodiment of FIGS. 3-5, the cover 36 is provided in the form of a cover plate 42. The cover plate 42 can be releasably attached to the arm 38 by different attachment techniques. Ideally though, the attachment is robust enough to endure the automated welding operation that is typical in automotive applications. Here, the cover plate 42 has a generally rectangular shape, has a first end 44 releasably attached to the arm 38 and a second free end 46 suspended away from the attachment, and has a first outer surface 48 that confronts the aluminum workpiece 16 and a second outer surface 50 that confronts a weld face 52 of the second welding electrode 28 (FIG. 5). Between its ends 44, 46, the cover plate 42 has a longitudinal length sufficient to span the full extent of the weld face 52 so that the weld face 52 abuts the cover plate 42 and not the aluminum workpiece 16 when inserted and in use. Likewise, the cover plate 42 has a lateral width transverse to its longitudinal length sufficient to span the full extent of the weld face 52 when the cover plate 42 is inserted between the second welding electrode 28 and the aluminum workpiece 16 at the weld site 30. Here, as shown, the second outer surface 50 of the cover plate 42 makes contact with a greater surface area of the aluminum workpiece 16 than the second welding electrode 28 otherwise would in the absence of the cover plate 42.

The cover plate 42 can have a variety of constructions that render it more electrically resistive than the aluminum workpiece 16. In one specific example, the cover plate 42 is made of a low carbon steel and has a thickness 420 (FIG. 5) that ranges between 0.1 mm and 0.4 mm. This example of the cover plate 42 might be used for a relatively limited number of individual resistance spot welds, such as up to ten, and could then be replaced with another yet-to-be-used cover plate 42. In another specific example, the cover plate 42 may be made of molybdenum or a molybdenum-based alloy, niobium or a niobium-based alloy, or a tungsten-copper alloy, and have a thickness that ranges between 0.5 mm and 10.0 mm. This example of the cover plate 42 is more durable than the previous example—based on thickness and material choice—and could thus be used for a relatively higher number of individual resistance spot welds, such as one-thousand or more. In this example, a periodic cleaning operation may be desirable to remove contamination from the cover plate 42 after a set number of welds is performed—e.g., ten to one-hundred welds—in order to extend the useful life of the cover plate 42. The contamination could result from the accumulation of melted aluminum at the outer surface of the aluminum workpiece 16 abutted by the cover plate 42. The cleaning operation could be carried out with rotating wire wheels, brushes, or other abrasive media.

The cover 42 can also be constructed from a copper alloy, preferably one that is more electrically resistive than the copper alloy used to make the second welding electrode 28 such as, for example, a Cu—Ni—Cr—Si alloy typically designated C18000, which has an electrical conductivity of about 45% IACS (The electrical conductivity associated with IACS (sometimes referred to as 100% IACS) is the electrical conductivity of commercially pure, annealed copper at 20° C., which is defined as $5.80 \times 10^7$ S/m). And while copper alloys are typically less electrically resistive than the aluminum workpiece 16, a cover plate 42 formed of such alloys can nonetheless be effective at reducing the current density of the electrical current within, as well as generating and introducing some heat into, the aluminum workpiece 16. The cover plate 42, if made from a copper alloy, can have a thickness that ranges between 0.5 mm and 10.0 mm, making it durable and able to participate in multiple resistance spot welding events, especially when subjected to periodic cleaning to remove contamination.

FIG. 6 depicts an embodiment similar to that of FIGS. 3-5. But in this embodiment, a linkage 54 is equipped between the arm 38 and the second welding gun arm 20. The linkage 54 can provide a more restrained movement between the inserted and removed positions, and can include one or more pivotally coupled links 56. These types of linkages, as well as others, are known to those skilled in the art and may include spring components, damper components, and/or other components that facilitate movement.

Figure 7:
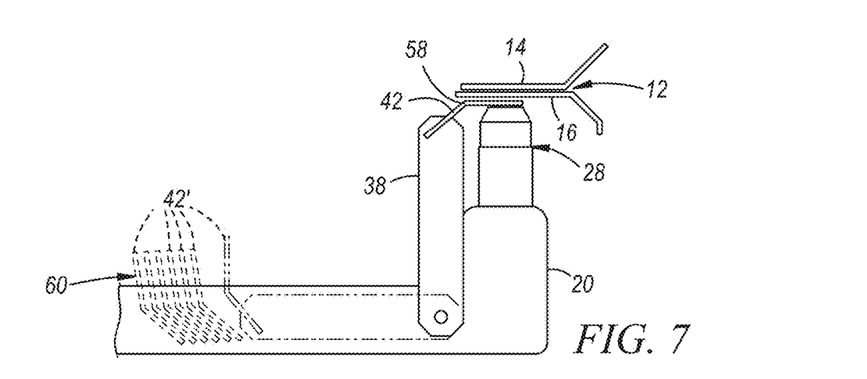
FIG. 7 is a side view of yet another embodiment of a cover that is to be inserted between an aluminum workpiece and an adjacent welding electrode and of an associated welding gun arm.

FIG. 7 depicts another embodiment similar to that of FIGS. 3-5. In this embodiment, the arm 38 is shortened relative to its extent in the previous figures, and the cover plate 42 has a bend 58 formed in its body. The bend 58 raises the cover plate 42 away from a top end of the arm 38, as shown in FIG. 7. These measures facilitate accommodating a workpiece stack-up 12 with one or more bends or other configurations in its workpieces 14, 16, and preclude physical interference and obstruction among the arm 38, cover plate 42, and workpiece stack-up 12. Additionally, this embodiment, as well as the others presented, could include a mechanism for supplying spare cover plates 42' such as a magazine 60 equipped to or near the second welding gun arm 20. The magazine 60 facilitates replacement and loading of cover plates.

Figures 8, 9:
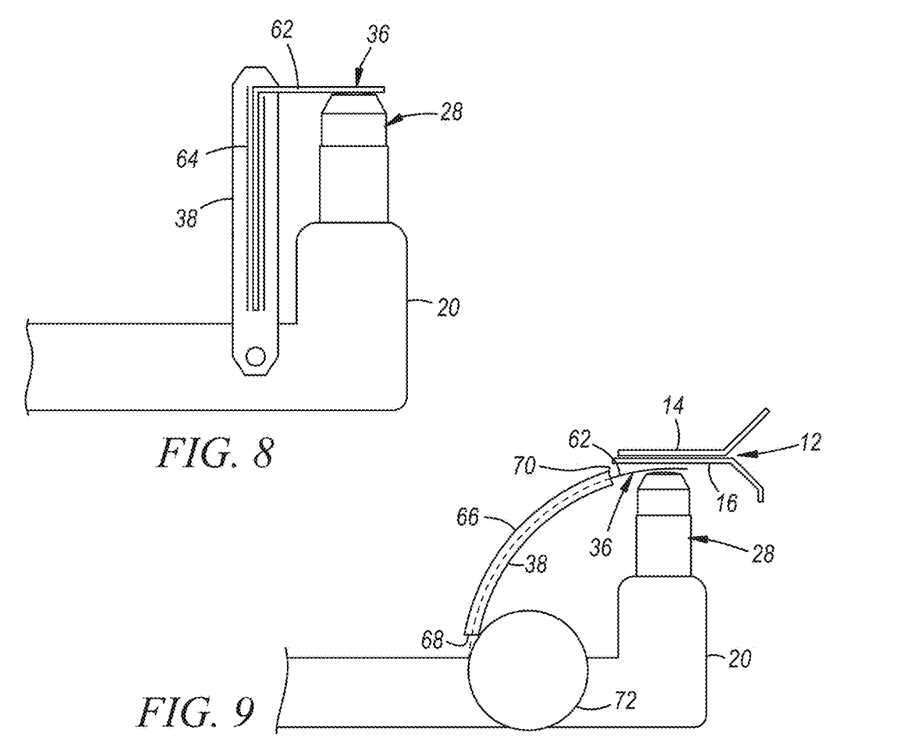
FIG. 8 is a side view of yet another embodiment of a cover that is to be inserted between an aluminum workpiece and an adjacent welding electrode and of an associated welding gun arm.
FIG. 9 is a side view of yet another embodiment of a cover that is to be inserted between an aluminum workpiece and an adjacent welding electrode and of an associated welding gun arm.

FIG. 8 depicts yet another embodiment similar in some ways to the embodiment of FIGS. 3-5. In this embodiment, however, the cover 36 is provided in the form of a cover tape 62. The cover tape 62 may be preferable for a single-use application in which a single spot weld even is conducted to form a single weld joint, a portion of the cover tape 62 subject to the spot welding event is severed and discarded, and then an unused portion of the cover tape 62 is extended in place of the severed portion for carrying out another spot welding event. The cover tape 62 may also be used in multiple-use applications before severing and discarding. The cover tape 62 can be made of a low carbon steel and can have a thickness that ranges between 0.1 mm and 0.4 mm. The arm 38 can have the same insertion and removal functionality as previously described for the embodiment of FIGS. 3 and 4, or could have a different insertion and removal functionality. To facilitate the severing and extension functions, a cutting mechanism can be equipped in or adjacent to the arm 38, and the arm 38 could have guide rails or grooves 64 for feeding the cover tape 62. And though shown schematically with sharp corners, the cover tape 62 could have a more rounded physical profile due to the dimensions (e.g., thinness) of the tape.

FIG. 9 depicts yet another embodiment similar in some ways to the embodiment of FIG. 8. Here too, the cover 36 is provided in the form of the cover tape 62 and can be used in single-use and multiple-use applications. In this embodiment, the arm 38 is provided in the form of an arcuately-shaped guide tube 66 with a hollowed passage for the extending the cover tape 62. The curvature of the guide tube 66 can roughly match the extended profile of the cover tape 62. The guide tube 66 can be equipped to, or equipped adjacent, the second welding gun arm 20, and has an open entry 68 for receiving the cover tape 62 and an open exit 70 for leading the cover tape 62 between the aluminum workpiece 16 and second welding electrode 28. The cover tape 62 is fed into the guide tube 66 via a spool 72 from which a supply of the cover tape 62 is unwound. The spool 72 can be replaceable when the supply of cover tape 62 is depleted. In this embodiment, the insertion and removal functionality can be carried out solely by the unwinding force exerted from the spool 72 and resulting extension of the cover tape 62, and not necessarily by intentional and active movement of the arm 38 like embodiments detailed elsewhere in this description, though this is a possibility. Indeed, the guide tube 66 can be a stationary structure.

In all of the embodiments detailed thus far, the cover 36 (plate, tape, or other form) can be inserted between the aluminum workpiece 16 and the second welding electrode 28 when resistance spot welding the aluminum and steel workpieces 14, 16, can be removed when spot welding steel-to-steel workpieces or aluminum-to-aluminum workpieces, and can be inserted once again for additional aluminum and steel workpieces. This furnishes the flexibility desired and oftentimes needed for resistance spot welding vehicle body parts in a manufacturing setting. In cases where the welding electrodes 24, 28 will also be used to weld aluminum-to-aluminum workpieces and/or steel-to-steel workpieces, the welding electrode design absent the cover 36 can be amenable to these processes. For steel-to-steel workpieces, for example, the welding electrodes can have a weld face diameter of 5 mm to 10 mm with a radii of curvature between 40 mm and flat. For aluminum-to-aluminum workpieces, for example, the welding electrodes can have a weld face diameter of 6 mm to 20 mm, and more preferably 8 mm to 12 mm, with a radii of curvature from 12 mm to 150 mm, and more preferably 20 mm to 50 mm.

Additionally, for aluminum-to-aluminum workpiece resistance spot welding, the weld face may have surface features to penetrate oxide layers formed on the aluminum surface. For instance, if desired, the weld face(s) can be textured, roughened, or have a set of protruding rings. Examples of these are described in U.S. Pat. Nos. 6,861,609; 8,222,560; 8,274,010; 8,436,269; and 8,525,066, and in U.S. patent application publication number 2009/0255908. In the case of some of these surface features such as protruding rings, the cover 36 may need to be thicker than described above in order to preclude excessive deformation upon clamp down of the welding electrodes 24, 28. For spot welding both aluminum-to-aluminum workpieces and steel-to-steel workpieces, in addition to the aluminum-to-steel workpieces 14, 16 discussed above, it has been found that welding electrodes with radii of curvature of 20 mm to 50 mm works well for all three types of workpieces when the cover 36 is used accordingly.

When used with the resistance spot welding assembly 10, the cover 36 is thought to alter the temperature gradients surrounding the molten aluminum weld pool and, in turn, the solidification behavior of the molten aluminum weld pool, and to thereby limit or altogether preclude the accumulation and dispersion of defects D at and all along the faying interface 32 within the aluminum weld nugget 34. Because the cover 36 is situated adjacent to the aluminum workpiece 16 and electrical current is passed through it, one or both of the following effects will typically materialize: (1) a reduction in current density of the electrical current within the aluminum workpiece 16, and (2) the generation and introduction of additional heat into the aluminum workpiece 16 at the outer surface of the aluminum workpiece 16 than would be the case if the cover 36 was not disposed between the aluminum workpiece 16 and the second welding electrode 28. Each of these effects is believed to change the cooling action of the molten aluminum weld pool as it solidifies to become the aluminum weld nugget 34 within the aluminum workpiece 16.

Figure 10:
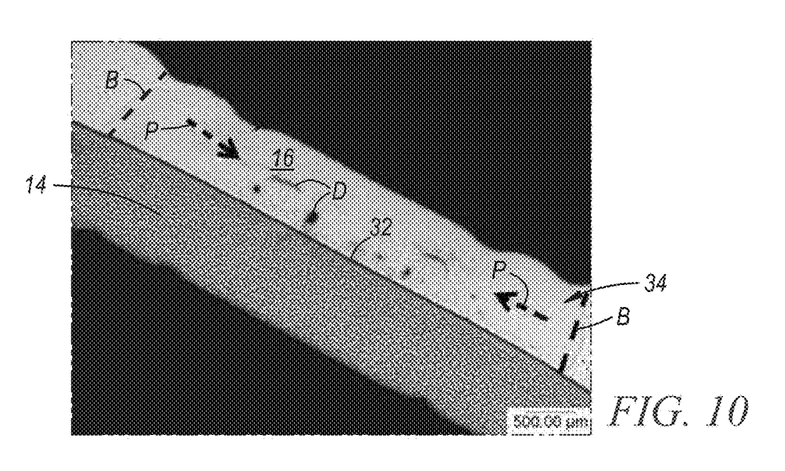
FIG. 10 is a microstructure of a weld nugget formed via a resistance spot welding process using a cover like the ones detailed in the description below.

Referring now to the microstructure of FIG. 10, instead of the solidification front progressing toward the faying interface 32 as is demonstrated in FIG. 2 and described above, the cover 36 causes the molten aluminum weld pool to cool and solidify inward from its outer perimeter. The path and direction of the solidification front is represented generally in FIG. 10 by broken arrows P, and a boundary of the aluminum weld nugget 34 is represented by broken lines B. The path P is pointed toward a central region of the weld nugget 34 and the boundary B is more orthogonal (compared to that shown in FIG. 2) relative to the faying interface 32 as a result of the altered solidification path. Any defects D that are present in the molten aluminum weld pool are thus swept or drawn toward the central region of the weld pool, and eventually the weld nugget 34, and are largely situated away from the faying interface 32, as depicted, or mainly at a central location at the faying interface 32.

The cover 36 facilitates the more-desirable solidification behavior of the molten aluminum weld pool by altering the temperature gradients surrounding the weld pool through a reduction in current density within the aluminum workpiece and/or the introduction of heat into the aluminum workpiece from the cover 36. By keeping the cover 36 in abutment with the aluminum workpiece 16 during solidification of the molten aluminum weld pool, including, if desired, for some time after the passage of electrical current between the welding electrodes 24, 28 has ceased, the rapid directional dissemination of heat from the molten aluminum weld pool through the aluminum workpiece 16 and into the second welding electrode 28 is slowed. Indeed, because it imposes a barrier to heat flow, the cover 36 does not permit the second welding electrode 28 to extract as much heat from the aluminum workpiece 16 as it normally would if the cover 36 was not present and the electrode 28 was pressed directly against the surface of the aluminum workpiece 16. Instead, heat is disseminated laterally out to the cooler portions of the aluminum workpiece 16 away from the weld site 30. As a result of all this, suitable peel strength is maintained and the overall strength and integrity of the weld joint established between the workpieces 14, 16 is ensured.

Moreover, the improved heat balance also means that the heat on the steel side of the workpiece stack-up 12 can be reduced, if desired, by reducing the electrical current level flowing between the welding electrodes 24, 28 and through the workpiece stack-up 12 during resistance spot welding. This reduction in current flow can reduce heating in the steel workpiece 14, minimize reactions between Fe and Al, and thereby minimize the attendant size and thickness of any Fe—Al intermetallic layer(s) that may form at the faying interface 32. It has been determined that the greater the size and thickness of Fe—Al intermetallic layers, the more brittle the layers and the more likely they are to fracture under load. Minimizing the layers helps maintain suitable peel strength and helps ensure overall strength and integrity of the weld joint.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding a steel workpiece and an aluminum or aluminum alloy workpiece together, the method comprising:
providing a workpiece stack-up that includes a steel workpiece and an aluminum or aluminum alloy workpiece, and providing a first welding electrode confronting the steel workpiece and a second welding electrode confronting the aluminum or aluminum alloy workpiece, the first welding electrode being carried by a first welding gun arm and the second welding electrode being carried by a second welding gun arm, each of the first and second welding electrodes being composed of a copper alloy;
bringing a cover from a removed position in which the cover is not inserted between the aluminum or aluminum alloy workpiece and the second welding electrode to an inserted position in which the cover is inserted between the aluminum or aluminum alloy workpiece and the second welding electrode, the cover being made of a metal, and wherein bringing the cover from the removed position to the inserted position comprises rotating a pivot arm that is pivotally connected to the second welding gun arm;
pressing the first welding electrode against the steel workpiece and the second welding electrode against the cover at a weld site; and
passing electrical current between the first and second welding electrodes, through the workpiece stack-up, and through the cover to initiate and grow a molten weld pool within the aluminum or aluminum alloy workpiece.

2. The method as set forth in claim 1, wherein the second welding electrode is composed of a material having an electrical resistivity, and wherein the cover has an electrical resistivity that is greater than the electrical resistivity of the second welding electrode.

3. The method as set forth in claim 2, wherein the cover is made of a stainless steel, molybdenum or a molybdenum-based alloy, niobium or a niobium-based alloy, or tungsten or a tungsten-based alloy.

4. The method as set forth in claim 1, wherein the cover is a cover plate that has a first outer surface and a second outer surface, and wherein the second welding electrode is pressed against the second outer surface of the cover plate and the first outer surface of the cover plate makes contact with a greater surface area of the aluminum or aluminum alloy workpiece than the second welding electrode makes with the second outer surface of the cover plate.

5. The method as set forth in claim 4, wherein the cover plate is made of a stainless steel, molybdenum or a molybdenum-based alloy, niobium or a niobium-based alloy, tungsten or a tungsten-based alloy, or a copper alloy.

6. The method as set forth in claim 1, wherein the cover is a cover plate.

7. The method as set forth in claim 6, wherein the pivot arm is mounted and iournalled to the second welding gun arm by a pivot axle, and wherein rotating the pivot arm comprises rotating the pivot arm about the pivot axle along a swing path between the removed position of the cover plate and the inserted position of the cover plate, and wherein the cover plate includes a first outer surface and a second outer surface, the first outer surface making contact with the aluminum or aluminum alloy workpiece and the second outer surface confronting the second welding electrode, the first outer surface of the cover plate being in broader interfacial contact with the aluminum or aluminum alloy workpiece than the second welding electrode is with the second outer surface of the cover plate such that, during passing electrical current between the first and second welding electrodes, a current density of the electrical current is reduced within the aluminum or aluminum alloy workpiece.

8. The method as set forth in claim 6, wherein the cover plate has at least one bend located in its body.

9. The method as set forth in claim 6, further comprising the step of replacing the cover plate with a second cover plate after the formation of a plurality of individual weld joints.

10. The method as set forth in claim 6, wherein the pivot arm is further connected to the second welding gun arm by a linkage.

11. The method as set forth in claim 6, further comprising the step of removing contamination gathered on an outer surface of the cover plate.

12. The method as set forth in claim 1, wherein the cover is a portion of a severable cover tape that has a thickness between 0.1 mm and 0.4 mm.

13. The method as set forth in claim 12, wherein the cover tape is guided by the pivot arm.

14. The method as set forth in claim 1, further comprising:
removing the cover from between the aluminum or aluminum alloy workpiece and the second welding electrode;
providing a second workpiece stack-up that includes a second steel workpiece and a third steel workpiece, or that includes a second aluminum or aluminum alloy workpiece and a third aluminum or aluminum alloy workpiece;
pressing the first and second welding electrodes against opposite sides of the second workpiece stack-up; and
passing electrical current between the first and second welding electrodes and through the second workpiece stack-up.

15. The method as set forth in claim 14, further comprising:
providing a third workpiece stack-up that includes a fourth steel workpiece and a fourth aluminum or aluminum alloy workpiece;
bringing a second, different cover from a removed position in which the second cover is not between the fourth aluminum or aluminum alloy workpiece and the second welding electrode to an inserted position in which the second cover is inserted between the fourth aluminum or aluminum alloy workpiece and the second welding electrode, the second cover being made of a metal, and wherein bringing the second cover from the removed position to the inserted position comprises rotating the pivot arm;
pressing the first welding electrode against the fourth steel workpiece and the second welding electrode against the second cover at a weld site; and
passing electrical current between the first and second welding electrodes, through the third workpiece stack-up, and through the second cover to initiate and grow a weld pool within the fourth aluminum or aluminum alloy workpiece.

16. The method as set forth in claim 14, further comprising:
providing a third workpiece stack-up that includes a fourth steel workpiece and a fourth aluminum or aluminum alloy workpiece;
bringing the cover from a removed position in which the cover is not between the fourth aluminum or aluminum alloy workpiece and the second welding electrode to an inserted position in which the cover is inserted between the fourth aluminum or aluminum alloy workpiece and the second welding electrode, and wherein bringing the cover from the removed position to the inserted position comprises rotating the pivot arm;
pressing the first welding electrode against the fourth steel workpiece and the second welding electrode against the cover at a weld site; and
passing electrical current between the first and second welding electrodes, through the third workpiece stack-up, and through the cover to initiate and grow a weld pool within the fourth aluminum or aluminum alloy workpiece.

17. A method of resistance spot welding a steel workpiece and an aluminum or aluminum alloy workpiece together, the method comprising:
providing a workpiece stack-up that includes a steel workpiece and an aluminum or aluminum alloy workpiece, and providing a first welding electrode confronting the steel workpiece and a second welding electrode confronting the aluminum or aluminum alloy workpiece, the first welding electrode being carried by a first welding gun arm and the second welding electrode being carried by a second welding gun arm, each of the first and second welding electrodes being composed of a copper alloy;
rotating a pivot arm that is pivotally connected to the second welding gun arm to bring a cover plate from a removed position in which the cover plate is not inserted between the aluminum or aluminum alloy workpiece and the second welding electrode to an inserted position in which the cover plate is inserted between the aluminum or aluminum alloy workpiece and the second welding electrode, the cover plate being made of a metal that has a higher electrical resistivity than that of the aluminum or aluminum alloy workpiece and further including a first outer surface and a second outer surface;
pressing the first welding electrode against the steel workpiece and the second welding electrode against the cover plate at a weld site, the second welding electrode being pressed against the second outer surface of the cover plate and a first outer surface of the cover plate making broader interfacial contact with the aluminum or aluminum alloy workpiece than the second welding electrode makes with the second outer surface of the cover plate; and
passing electrical current between the first and second welding electrodes, through the workpiece stack-up, and through the cover plate to initiate and grow a molten weld pool within the aluminum or aluminum alloy workpiece, the cover plate causing a current density of the electrical current to decrease within the aluminum or aluminum alloy workpiece.

18. The method set forth in claim 17, wherein the cover plate is made of a stainless steel, molybdenum or a molybdenum-based alloy, niobium or a niobium-based alloy, or tungsten or a tungsten-based alloy.

19. The method set forth in claim 17, wherein the pivot arm is mounted and journalled to the second welding gun arm by a pivot axle, and wherein rotating the pivot arm comprises rotating the pivot arm about the pivot axle along a swing path between the removed position of the cover plate and the inserted position of the cover plate.

* * * * *